US005486924A

United States Patent [19]
Lacey

[11] Patent Number: 5,486,924
[45] Date of Patent: Jan. 23, 1996

[54] METHOD AND APPARATUS FOR MEASUREMENT OF ROUGHNESS AND HARDNESS OF A SURFACE

[75] Inventor: Christopher Lacey, San Diego, Calif.

[73] Assignee: Phase Metrics, San Diego, Calif.

[21] Appl. No.: 172,471

[22] Filed: Dec. 22, 1993

Related U.S. Application Data

[62] Division of Ser. No. 781,820, Oct. 23, 1991, Pat. No. 5,280,340.

[51] Int. Cl.$^6$ .................................................. G01B 9/02
[52] U.S. Cl. ............................ 356/357; 356/72; 73/81
[58] Field of Search ............................ 356/72, 345, 357, 356/358, 376, 378; 73/81; 360/73.03

[56] References Cited

U.S. PATENT DOCUMENTS

| | | |
|---|---|---|
| 2,830,490 | 4/1958 | Pellegrini . |
| 3,421,079 | 1/1969 | Bennett et al. . |
| 4,092,068 | 5/1978 | Lucas et al. . |
| 4,293,224 | 10/1981 | Gaston et al. . |
| 4,593,368 | 6/1986 | Fridge et al. . |
| 4,627,733 | 12/1986 | Wada . |
| 4,630,926 | 12/1986 | Tanaka et al. .......................... 356/357 |
| 4,639,139 | 1/1987 | Wyant et al. . |
| 4,650,330 | 3/1987 | Fujita . |
| 4,807,991 | 2/1989 | Carew . |
| 4,820,051 | 4/1989 | Yanagisawa et al. ................... 356/378 |
| 4,832,489 | 5/1989 | Wyant et al. . |
| 4,854,708 | 8/1989 | Kafri et al. . |
| 4,878,114 | 10/1989 | Huynh et al. . |
| 4,931,630 | 6/1990 | Cohen et al. . |
| 4,948,251 | 8/1990 | Kondo . |
| 5,028,136 | 7/1991 | Murarka et al. . |
| 5,280,340 | 1/1994 | Lacey ...................................... 356/357 |

FOREIGN PATENT DOCUMENTS 2-156105  6/1990  Japan .

OTHER PUBLICATIONS

G. L. Best et al.; "Precise Optical Measurements of Slider Dynamics"; *IEEE Transactions on Magnetics*, vol. MAG–22, No. 5, Sep. 1986, pp. 1017–1018.

T. Ohkubo et al.; "Accurate Measurement of Gas–lubricated Slider Bearing Separation Using Visible Laser Interferometry"; *Journal of Triboloby Transactions of the ASME*, Oct. 1987, pp. 1–6.

D. L. Lipschutz; "Dynamic Measurement of Small Separations by a Light Interference Method"; *IEEE: Proceedings of the International Conference on Magnetic Recording*, London, Jul. 1964, pp. 87–90.

W. N. Hansen; "Electric Fields Produced by the Propagation of Plane Coherent Electromagnetic Radiation in a Stratified Medium"; Journal of the Optical Society of America, vol. 58, No. 3, Mar. 1968, pp. 380–390.

(List continued on next page.)

*Primary Examiner*—Samuel A. Turner
*Attorney, Agent, or Firm*—Dennis H. Epperson

[57] ABSTRACT

Light is focused on an interface between a transparent probe and a surface to be analyzed. The probe is lowered onto the surface using a computer-controlled actuator. Light reflected from the surface of the probe which is closest to the surface and the surface itself recombines, producing interference effects from the spacing between the probe and the surface over a 2-dimensional area. Since the shape of the probe in known beforehand, the profile of the surface can be readily calculated from the 2-dimensional measurement of the spacing between the probe and the surface. This surface profile indicates the roughness of the surface. The surface hardness and other surface properties can be measured by pressing the probe onto the surface. The contact load between the probe and the surface is detected by a load cell. The force with which the probe is being pressed onto the surface is measured using the load cell. The surface profile can continue to be measured interferometrically while it is being deformed by the probe. The measurement of surface deformation as a function of contact pressure allows the measurement of surface hardness while causing a minimum amount of damage to the surface.

9 Claims, 5 Drawing Sheets

OTHER PUBLICATIONS

K. Tanaka et al.; "Measurements of Transient Motion of Magnetic Disk Slider"; *IEEE Transactions on Magnetics,* vol. MAG–20, No. 5, Sep. 1984, pp. 924–926.

J. M. Fleischer et al.; "Infrared Laser Interferometer for Measuring Air–Bearing Separation", *IBM J. Res. Develop.,* Nov. 1974, pp. 529–533.

A. Nigam; "A Visible Laser Interferometer for Air Bearing Separation Measurement to Submicron Accuracy"; *Journal of Lubrication Technology, Transactions for the ASME;* vol. 104, Jan. 1982, pp. 60–65.

Y. Mizoshita et al.; "Dynamic Characteristics of a Magnetic Head Slider"; *IEEE Transactions on Magnetics;* vol. MAG–21, No. 5, Sep. 1985, pp. 1509–1511.

C. Lin; "Techniques for the Measurement of Air–Bearing Separation–A Review"; *IEEE Transactions on Magnetics,* vol. MAG–9, No. 4, Dec. 1973, pp. 673–677.

C. Lin et al.; "An Application of White Light Interferometry in Thin Film Measurements"; *IBM J. Res. Dev.* May 1972, pp. 269–276.

G. L. Best; "Comparison of Optical and Capacitive Measurements of Slider Dynamics"; *IEEE Transactions on Magnetics,* vol. MAG–23, No. 5, Sep. 1987, pp. 3453–3455.

S. Yamamoto et al.; "Real Time Observation of Head–To–Medium Interface in Flexible Perpendicular Magnetic Recording Disc System"; publication and date unknown.

Sales Brochure; ProQuip FM8801; publication date unknown.

Sales Brochure; PPL Aautomatic Digital Flying Height Tester; publication date unknown.

Y. Mizoshita et al.; "Dynamic Characteristics of a Magnetic Head Slider"; *IEEE Transactions on Magnetics,* vol. MAG–21, No. 5, Sep. 1985, pp. 1509–1511.

M. Mizukawa et al.; "Study on Spherical Foil Bearing"; *Bulletin of JSME,* vol. 28, No. 243, Sep. 1985, pp. 2105–2111.

Sales Brochure; Dynamic Flying Height Tester; Phase Metrics; 6 pages; publication date unknown.

C. Lacey et al,; "A New Method for Measuring Flying Height Dynamically"; Phase Metrics; 1992, pp. 1–6.

5,486,924

METHOD AND APPARATUS FOR MEASUREMENT OF ROUGHNESS AND HARDNESS OF A SURFACE

This application is a division of application Ser. No. 07/781,820; filed Oct. 23, 1991; issued as U.S. Pat. No. 5,280,340 on Jan. 18, 1994.

BACKGROUND OF THE INVENTION

The rapid increase in the operating speed of computers has led to significant demands on both data storage capacity and access speed. The hard disk drive has been steadily evolving and continues to offer a cost-effective solution to both capacity and speed requirements. Increases in data storage densities and miniaturization of disk drives have enabled even small portable computers to have access to large amounts of on-line storage.

In disk drives, head-to-media speeds are such that an air bearing is generated between the head and the disk. At increased speeds the air bearing increases. Thus, without means to counter the tendency to increase the head/media spacing, losses will occur.

Manufacturers of hard disk drives typically measure the flying height of all head/gimble assemblies before assembling them into drives in order to avoid reworking drives after assembly when they do not meet specifications. While head/media spacings in excess of 1 micron can be measured using monochromatic fringe counting techniques, spacings below 1 micron are measured using white light interferometry due to its greater resolution in the range of 250 to 750 nm. Constructive or destructive interference results in the generation of different color fringes which are compared to a Newton's color chart or analyzed by spectrometer. This technique is the current industry standard, however, at spacings of less than 150 nm, the colors wash together and cannot be interpreted with reasonable accuracy.

Various other techniques have been developed for the measurement of small spacings, however, there methods are still incapable of accurately measuring spacing down to contact. One example is U.S. Pat. No. 4,593,368 by Fridge et al. This patent describes the use of a computerized spectro-photometer to analyze the color of white light fringes produced at the interface of two surfaces, one of which is transparent, when subject to broad-band illumination. This measuring system and technique has the following disadvantages: 1) At very low spacing (less than $\lambda/5$) no distinct colored fringes are produced. Therefore, at this small spacing, relatively small changes in light intensity as a function of wavelength are measured by the computerized spectro-photometer. Since the measurable change in intensity as a function of wavelength (the color) is greatly reduced at spacings below $\lambda/5$, the signal-to-noise ratio of the measurement greatly decreases for such small spacings. 2) The spectro-photometer employed requires 0.05 seconds to acquire the intensity data for the spectrum of light being used for the measurement. The lengthy time required for data acquisition precludes dynamic measurement of spacing above 10 Hz.

In a method disclosed by Tanaka et al. (U.S. Pat No. 4,630,926) an interferometer is used to dynamically measure head/disk spacing. A xenon source with a monochrometer produces monochromatic light which is directed over the length of a slider which is inclined such that the spacing between a clear glass disk and the slider varies by more than $\lambda/4$. In such a case where the slider is incident with respect to the disk and the spacing varies by more than $\lambda/4$, at least one maxima and one minima of interferometric fringe intensity occurs. Tanaka et al. teach that at the maximum and minimum (extrema) of fringe intensity, two-beam and multi-beam interferometric theory yield the same spacing. Therefore, at the extrema, the simpler two-beam theory is used. Tanaka et al. also vary the wavelength of the light being used in order to 1) get fringe extrema and, therefore, spacing measurement at different points along the slider; and 2) verify which order fringe is being detected.

The system of Tanaka et al. is limited in that it cannot measure spacing below $\lambda/4$ of the monochromatic light being used and it is too slow to measure air bearing resonances. Tanaka et al.'s system is clocked at a frequency of 15.8 kHz making it incapable of measuring typical air bearing resonances of 20 kHz or more.

Another to measure slider/disk spacing is disclosed in Ohkubo et al.'s paper "Accurate Measurement of Gas-lubricated Slider Bearing Separation Using Visible Laser Interferometry" which was distributed as paper 87-Trib-23 by the American Society of Mechanical Engineers. This paper describes the basis of operation for the FM 8801 Laser-Based Flying Height Measuring System which is sold in the U.S.A. by ProQuip, Inc., Santa Clara, Calif. As described in Ohkubo et al.'s paper, the system uses a HeNe laser source. The beam from the laser goes through a beamsplitter where part of the beam is directed toward a reference photodetector which detects variation in the intensity of the laser source. The remaining part of the laser beam goes through a beam expander then through a lens which focuses the illumination onto the slider/glass disk interface. This illumination causes interference fringes which are focused onto a second measurement photodetector used for measuring intensity of the fringes. The measurement and reference signals from the two photodetector are sent through amplifiers then into a divider circuit such that the interference signal is normalized to the input laser intensity. From the divider, the signal is sent an A/D converter to a desk top computer for processing. The desk top computer digitizes interferometric intensity while the disk changes from a high speed to a low speed.

During the change of disk speed, Ohkubo et al. show flying height to decrease by more than $\lambda/2$. Since the flying height changes, the interferometric intensity varies enough to detect at least one maximum and one minimum fringe intensity. These maximum and minimum fringe intensities are recorded for reference. With the reference maxima and minima of fringe intensity, multi-beam interferometric theory is applied to determine spacings from intensity. However, since for a monochromatic interferometric intensity is a periodic function of spacing, the "fringe order" must be know to finally determine the spacing. This "fringe order" is precisely defined as the interval of spacing from $n/4\lambda$ to $(n-1)/4\lambda$ for $n=1, 2, 3$. Given an interferometric intensity, and a maximum and minimum fringe intensity for reference, the fringe order n must be determined in order to calculate spacing from the interferometric theory. According to Ohkubo et al.'s paper, the fringe order is determined by landing the slider on the disk by reducing disk speed while monitoring interferometric intensity. The fringe order can be determined by counting the number of times that the interferometric intensity rises to the maximum or falls to the minimum while the spacing is being reduced from the measurement point to the minimum spacing which is assumed to be the fringe order where $n=1$.

The Ohkubo et al. system has the following disadvantages: 1) the slider must have a design such that the flying height will increase to above λ/2 simply by changing disk speed; 2) the slider must be landed on the glass disk to determine the fringe order for the spacing calculation; and 3) at the points where the fringe intensity is a minima or maxima, the slope of the interferometric intensity/spacing curve becomes zero. At these points, the noise in electronic intensity measurement causes a large error in spacing measurement relative to the other spacings which are not directly on the fringe maximum or minimum.

The above-identified disadvantages may cause the following problems: 1) new sliders with a new geometries designed for very low flying height may not fly as high as λ/2, even at very fast disk speeds, so the Ohkubo et al. technique will not work for such; 2) landing the slider on the disk (required to determine the fringe order) may cause some damage to the air bearing surface of the slider. The possibility for damage to the air bearing surface during test is highly undesirable since many manufacturers test every slider assembly to insure proper flying height; and 3) the relatively high error in spacing measurement at fringe maxima and minima is hidden by "intensity correction" and data "smoothing". These procedures can introduce additional errors into the spacing which is finally calculated.

As magnetic recording technology continues to improve, slider flying heights should continue to decrease to below 100 nm. Also, some manufacturers are beginning to use fluid in the gap to permit smaller spacings. These, too, must be measured. The invention disclosed in this patent is intended to measure such flying heights, statically and dynamically, without having to land the slider on the disk, or have the spacing increase above λ/2 by only changing disk speed.

The method of intensity calibration and fringe order determination disclosed in this patent can also be applied to other measurements where spacing is decreased to the point of contact, in particular, a micro-hardness tester using a transparent probe could be implemented with interferometric measurement of spacing between the surface and the probe using this method of interferometric intensity calibration.

SUMMARY OF THE INVENTION

It is an advantage of the present invention to provide a device for measuring static or dynamic spacing between a transparent article and a reflective surface spacing where the spacing is air or a fluid (down to contact).

Another advantage is to provide a system for measuring flying height which does not require landing of the slider on the disk to determine fringe order.

It is a further advantage of the present invention to provide a flying height tester which uses a calibration procedure to determine maximum and minimum intensity of interference fringes yet is insensitive to changes in illumination intensity or surface reflectivity.

It is still another advantage of the present invention to provide a device capable of measurement of disk surface roughness for an entire disk.

In an exemplary embodiment, the dynamic flying height tester uses a mercury arc lamp light source to provide three distinct wavelengths of light so that three separate interference fringes are generated. Light from the mercury arc lamp is directed substantially normal to the surface of a transparent disk, through the disk and onto the slider on which a magnetic head is mounted. The light reflected from the slider and from the surface of the disk closest to the slider is combined and spectrally analyzed for constructive and destructive interference at each of the three wavelengths. The spectral analysis is accomplished by a detector assembly which includes wavelength discriminating beamsplitters, a filter for each individual wavelength to be measured and a high speed photodetector for each wavelength. The microscope is also connected to a video monitor for visual monitoring of the fringe pattern.

A calibration procedure involves measurement of the intensity of all colors while partially unloading the head to determine the maximum and minimum intensity of the fringes for each color being used and to identify the correct fringe orders of the interference patterns. The partial unload for calibration is implemented by rotary head unload which is used to move the head away from the detection assembly by a very small distance, on the order of 0.25 μm. In addition to the demonstrated rotary unload mechanism, any mechanical device which causes the spacing between the head and disk to vary by a quarter wavelength or more can be used to cause the spacing change required for calibration.

Since some parameters such as disk speed or head/disk relative position may be changed after the calibration but prior to the desired measurement, a "follow" trace is made to determine the fringe orders of the measurements trace. The follow trace consists of a spacing measurement trace. The follow trace consists of a spacing measurement which is made during the time any changes occur between the calibration trace and the measurement trace. The follow trace is often required to track the fringe order when changes are made to the head/disk system in between the calibration procedure and the measurement.

Once the calibration trace and follow trace are analyzed, the absolute interferometric intensity reference is known, and the fringe orders for the measurement are known, Therefore, measurement of flying height is accomplished by comparing measured intensity with the theoretical intensity versus spacing relationship. The measurement of spacing can be displayed as spacing versus angular position of the disk or spacing versus time. Also, parameters such as average spacing, maximum spacing, minimum spacing and others can be calculated from the dynamic spacing data and logged for future reference.

An alternative light source can be a plurality of lasers where each laser emits a different wavelength light, the wavelengths preferably being relatively short to enable measurement of small spacings.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENT

Figure 1:
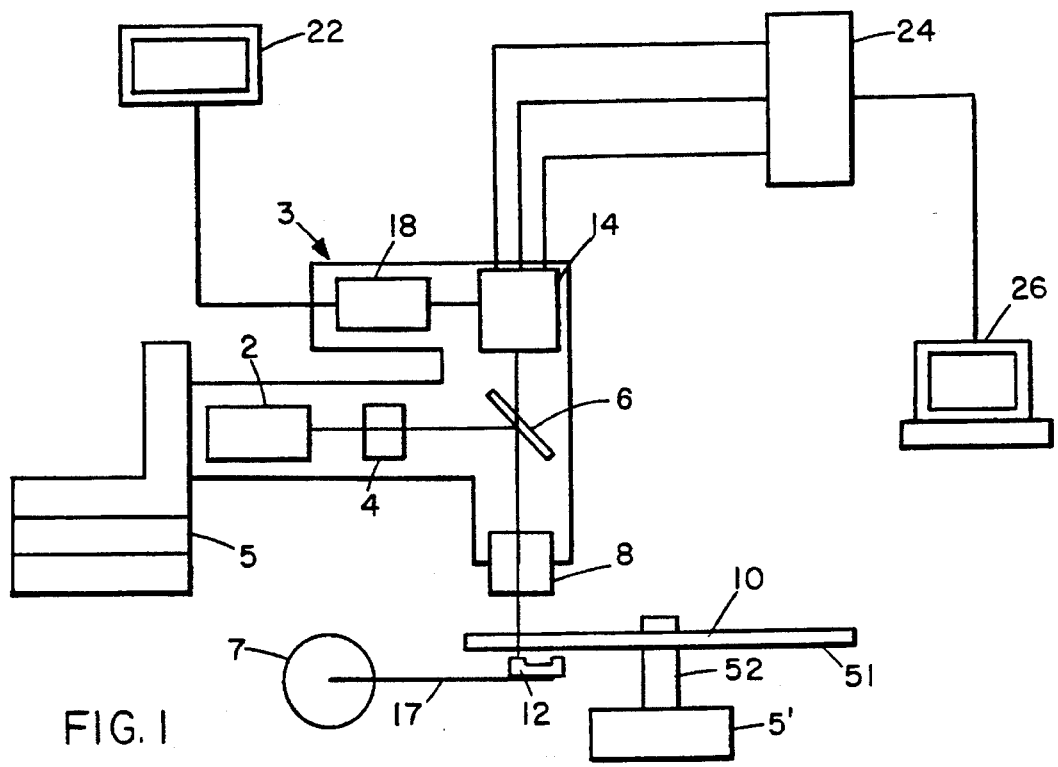
FIG. 1 is a diagrammatic view of the flying height testing assembly of the present invention.

As illustrated in FIG. 1, light source 2 is directed through microscope 3 which comprises condensing optics 4, beamsplitter 6 and objective 8. A portion of the incident light split by beamsplitter 6 is directed through glass disk 10 and is internally reflected off the lower surface of the glass disk 10. Another portion of the light is reflected by slider 12. The reflected light is redirected through the objective lens and the beamsplitter 6 into detector assembly 14. The recombination of the light reflected by the lower surface of the disk 10 and the surface of slider 12 results in the generation of interference fringes, with one interference fringe being generated for each individual wavelength of light which has been selected by filters within the assembly. A camera 18 sends a visual image of the fringe patterns to video monitor 22. The photodetectors within the detector assembly 14 convert the fringes' intensity into electrical signals which are then converted to digital data by A/D converter 24. The digital data are then processed at processor 26.

Disk 10 is mounted on spindle 52 which is attached to a variable speed drive capable of achieving speeds in excess of 7200 rpm. In the first embodiment illustrated in FIG. 1, the disk 10 is transparent glass or quartz. The slider 12 is attached to rotary load/unload arm 17, which is further illustrated in FIG. 8a, by clamping suspension 13, illustrated in FIG. 7, onto the end of arm 17 at a given location. Rotary load/unload arm 17 is drive by rotary motor 7. Slider 12 is then positioned under the disk 10 so that light focused by objective 8 passes through disk 10 to be reflected from slider 12 and from the bottom edge 51 of disk 10.

Figure 6:
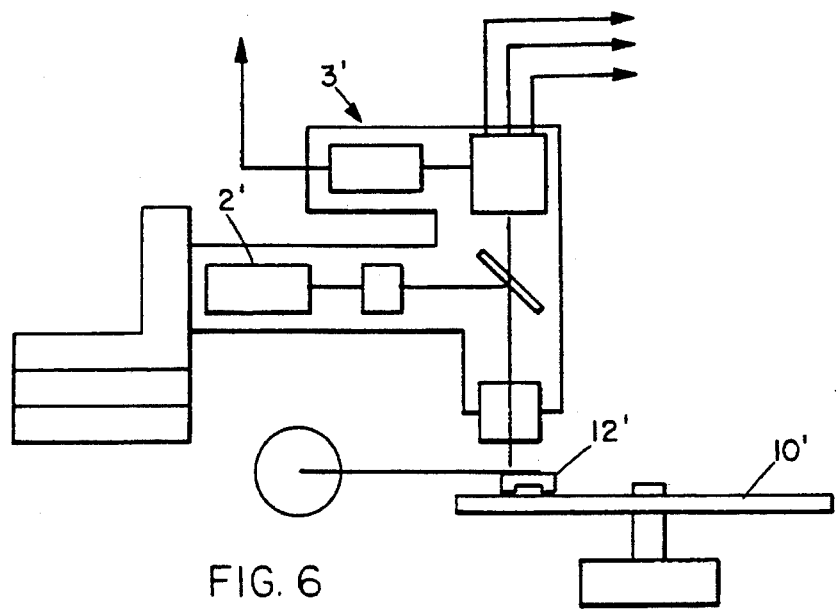
FIG. 6 is an alternate configuration of the testing assembly for measurement of disk surface roughness.

In an alternate embodiment shown in FIG. 6, the light source 2' and microscope assembly 3' are positioned relative to the arm and drive so that the slider 12' is between the microscope assembly 3' and disk 10'. Slider 12' is transparent, permitting glide height measurement of an actual magnetic disk 10'. Such a configuration provides measurement of disk surface roughness to identify disk asperities for mapping of asperity heights.

Rotary load/unload arm 17 pivots in such a manner that the slider 12 moves along a line following the light path exiting from objective 8 for at least part of the unload motion. This allows the light to be focused on the same spot on the slider 17 during the calibration procedure, which is described below. The purpose of this movement is to scan at least fringe maximum and minimum for each color used by increasing the head/disk spacing. Only a small spacing change required, on the order of 0.25 μm, to measure a maximum and minimum intensity for each color fringe to enable calibration. The remainder of the load/unload motion is not critical to measurement functions.

Figure 2:
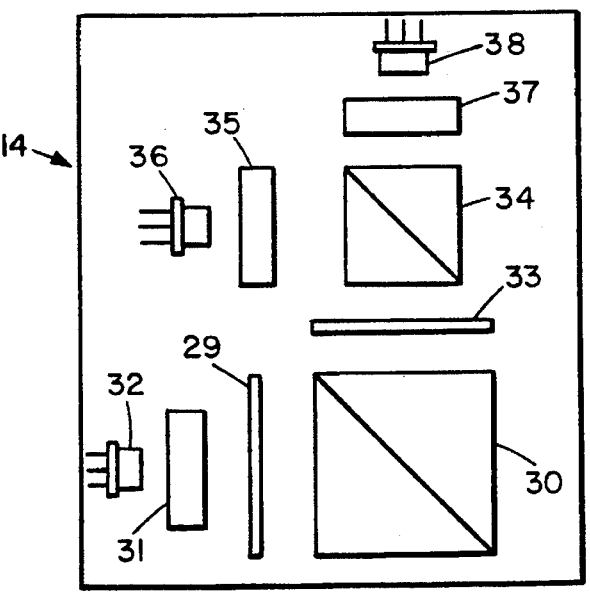
FIG. 2 is a diagrammatic view of the detector assembly.

FIG. 2 illustrates the elements of detector assembly 14. A first beamsplitter cube 30 reflects light at 436 nm toward absorption pinhole mirror 29 and 436 nm interference filter 31 to photodetector 32. Beamsplitter cube 30 is a dichroic beamsplitter made from BK7. The entrance face has an anti-reflection coating. The interface is coated for 85–95% reflectance at 435.8 nm and 85–95% transmittance at 546 nm and 580 nm. The portion of light which passes through beamsplitter cube 30 passes through reflective pinhole mirror 33 to beamsplitter cube 34 which reflects light at 546 nm toward 546 nm interference filter 35 and detector 36. Beamsplitter 34 is also dichroic and made from BK7. Its interface coating is 90–100% reflective at 546 nm and 90–100% transmissive at 580 nm. Each of the interference filters are commercially available filters which transmit light at the chosen wavelength with a bandwidth of 10 nm. The photodetectors are silicon avalanche photodiodes with spectral response in the range of 400–1000 nm. The remaining light continues forward through 580 nm interference filter 37 to photodetector 38. A separate signal is therefore generated for each selected wavelength, and each analog signal generated by photodetectors 32, 36 and 38 is converted to a digital signal by high speed A/D converter 24.

The timing signal by which the sampling rate is controlled is 250 kHz. The timing rate is applied to the A/D converter as a conversion rate control signal. This rapid rate of data conversion enables dynamic measurement of spacing between the head and disk.

Figure 3:
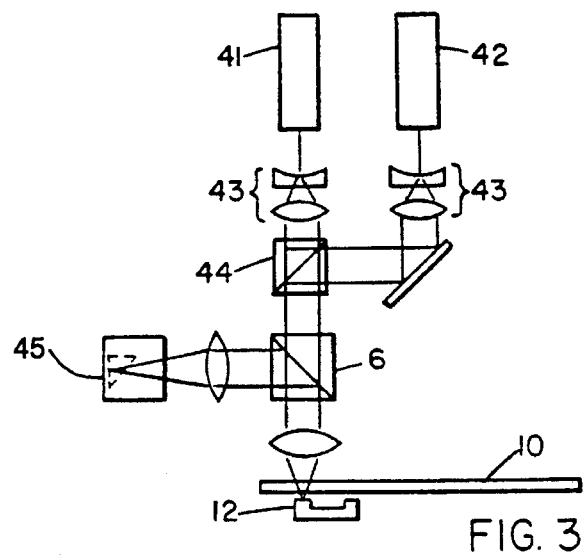
FIG. 3 is a diagrammatic view of the assembly with an alternate light source.

In an alternate embodiment, light beams emitted from two or more lasers can be optically combined to generate the illumination projected onto the head/disk interface. Such a configuration is illustrated in FIG. 3 in which lasers 41 and 42 each emit at different wavelengths. The beams are expanded by beam expander optics 43 and are combined at beamsplitter 44 to be projected through the microscope objective as above. The detector assembly 45 will have the same number of detectors as lasers, and the appropriate interference filters for the selected lasing wavelengths will be provided.

Figure 7A:
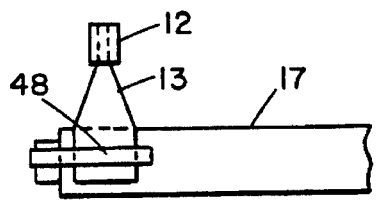
FIGS. 7a and 7b are diagrammatic view of the apparatus for attaching the head assembly to the load/unload arm.
Figure 7B:
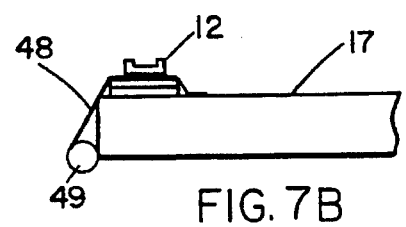
Figure 8A:
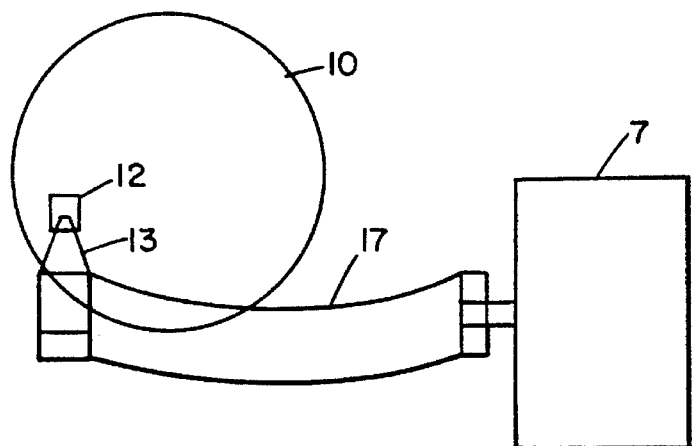
FIG. 8a is a diagrammatic top view of the rotary unload mechanism.

The accuracy and repeatability of the location of the head 12 with respect to the disk 10 requires that appropriate attachment means are provided to hold the head 12 into place. The suspension 13 must be attached to and removed quickly from the mounting arm 17, and the attachment must be uniform and repeatable. In order to quickly and repeatably grip the suspension 13, the use of a flexible band 48 of polyester film, such as Mylar® or Kapton®, is used, as shown in FIG. 7, with a tension means 49 included to keep the band 48 taut. Since the suspension 13 is somewhat flexible, it may be deformed under uneven or excessive pressure as might be applied by a steel clamp. The flexible band 48 does not deform the suspension 13 and is very thin, as required by the small spacing between the suspension 13 and the disk 10.

Figure 8B:
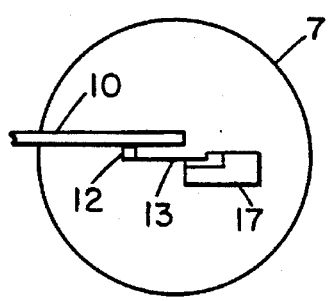
FIGS. 8b and 8c illustrate the load and unload positions, respectively.
Figure 8C:
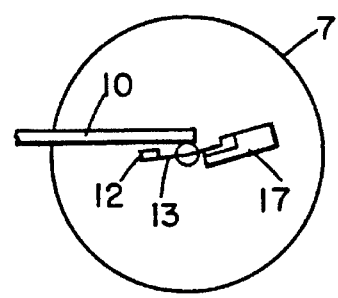

The procedure for measuring the spacing between the head 12 and the disk 10 is as follows:

The head 12 is attached to the suspension using the flexible band 48, and the rotary load/unload arm 17 moves the head 12 into the desired location, as in FIG. 8b. Light from the light source 2 is projected through the microscope 3 onto the head 12, and the head 11 is then partially unloaded by rotation of arm 17, as illustrated in FIG. 8c, so that a calibration trace can be generated. The head unload motion is synchronized with the digitization by the processor 26 such that the digitization will record the intensity of one maximum and one minimum fringe for each individual wavelength tested. The rotary head unload is used so that the slider 12 has only very slight motion while the loading pressure is reduced. The slight motion of the slider 12 is compensated for by moving the microscope assembly 3 by way of x-y translators 5 and 5' in synchronization with the unload motion so that the measurement spot remains at the same point on the slider 12. As previously described, the unload motion required for calibration increases the spacing by a very small amount, on the order of 0.5 μm.

The calibration trace is digitally lowpass filtered to reduce electronic noise. A maximum and minimum intensity for each color in the calibration trace is found by searching through the data collected. The trace is normalized to the maximum and minimum intensity for each color by multiplying a constant and adding a constant offset. In the preferred embodiment, the maximum intensity for each other color is scaled to 1.0 and the minimum intensity for each color is scaled to −1.0.

A look-up table for intensity of each color versus spacing is generated for discrete steps of spacing based on Equation 1 which was derived from multiple beam interferometric theory for a single film.

$$\frac{I_{OUT}}{I_{IN}} = \frac{r^2 + s^2 + 2rs \cos\delta}{1 + r^2 s^2 + 2rs \cos\delta} \quad (1)$$

where:

r=Amplitude Reflection Off Glass Disk;

s=Amplitude Reflectance Off Slider;

n=Refractive Index of the Fluid in the Spacing;

$\delta = 4\pi n H/\lambda - \gamma$;

H=Flying Height;

λ=Wavelength of the Illuminating Light; and

γ=Phase Shift on Reflection (Material Dependent)

The values of r, s, and γ are determined by ellipsometric measurement of the surfaces using light of the same wavelengths as those being used for the interference measurements of spacing.

The ellipsometer measures angles ψ and Δ from which the complex index of refraction $\bar{n}=n-ik$ can be determined. The reflectance for the disk and slider can then be determined from Equation 2:

$$r = \sqrt{\frac{(n_0 - n_1)^2 + k_1^2}{(n_0 + n_1)^2 + k_1^2}} \quad (2)$$

where $\bar{n}_0$ is the refractive index of the medium immediately above the reflecting surface which has the refractive index $\bar{n}_1$.

For the internal glass reflection $\bar{n}_0$ is the index of glass and $\bar{n}_1$ is the index of the fluid in the spacing. For the reflection off the slider, $\bar{n}_0$ is the index of the fluid in the spacing (air or liquid) and $\bar{n}_1$ is the index of the slider.

From the ellipsometric measurements, the phase change upon reflection γ can be calculated using Equation 3:

$$\gamma = \tan^{-1} \frac{2n_0 k_1}{n_0^2 - n_1^2 - k_1^2} \quad (3)$$

For use in Equation 1, $\gamma = \gamma_{slider} - \gamma_{glass\ disk}$.

In the present embodiment, a look-up table is generated using Equations 1, 2 and 3 with intensities for spacings for 0 to 1,000 nm with steps of 1 nm. The theoretic intensity look-up table is normalized to fringe intensity extrema using the same convention as that used for the measured traces, i.e., +1 is maximum, −1 is minimum.

Table 1 illustrates the form of the look-up table for intensity versus spacing:

TABLE 1

| SPACING | INTENSITY | | |
|---|---|---|---|
| | λ1 | λ2 | λ3 |
| 0 | −1 | −1 | −1 |
| 5 | −0.8 | −0.7 | −0.6 |
| 10 | −0.6 | −0.4 | −0.2 |

Once the measurements are made and the look-up table is generated, a calculation is made to determine the spacing for the first point in the calibration curve. The calculation of spacing is made as follows:

A "mean square error" is calculated for each discrete step of spacing (H) in the range of interest. Here, steps of spacing from 0 to 1,000 nm in steps of 1 nm are used. These steps conveniently correspond to the values in the theoretical look-up table above. The mean square error (e) is calculated as follows:

$$e(h) = w_1(T_1 - M_1)^2 + w_2(T_2 - M_2)^2 + w_3(T_3 - M_3)_2 \quad (4)$$

where $T_x$ is the theoretical intensity of color x for the spacing H (from the look-up table) and $M_x$ is the measured intensity of color x.

The symbols $w_x$ are used to indicate weighing functions which help reduce error. While all of the w's can be set to one, accuracy can be improved by choosing the w's such that $w_1 + w_2 + w_3$=some constant and setting each w higher for a color when the signal-to-noise ratio of that color's intensity measurement is higher. Additionally, $w_x$ may be a function of spacing because, near the maximum or minimum of a given color's intensity, a small amount of electrical noise corresponds to a relatively large change in spacing.

For reference purpose, the "first point" of a trace requires intensity measurements for all three colors, $\lambda_1$, $\lambda_2$ and $\lambda_3$. The measured intensity of all colors are stored together and they, as a group, will be referred to as a single point in the intensity trace.

Once (e) has been calculated for each step of spacing, the smallest value of (e) corresponds to a first guess for the initial spacing for the first point in the calibration array. Occasionally, noise in the intensity signal may result in the calculated value being the wrong fringe order. For example, considering only one color, if the normalized intensity is −1, the spacing is given by nλ/2 where λ is the wavelength of light and n is the fringe order (n=0, 1, 2, 3, 4 . . .). This result comes from a simple model which assumes the disk and slider are made of dielectric materials.

Figure 10:
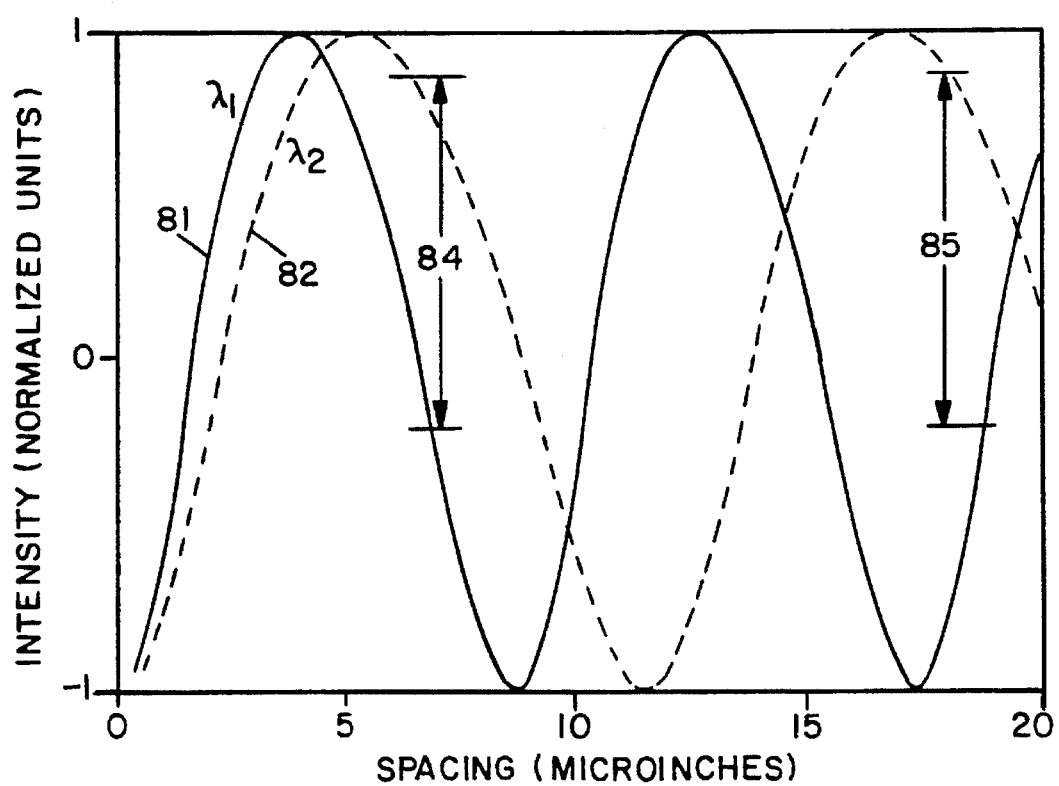
FIG. 10 is a plot of intensity versus spacing.

The use of two or more colors gives additional information which theoretically indicates the correct fringe order. However, the addition of some noise to the measured signals will occasionally cause this technique to calculate an initial spacing which is significantly incorrect because it is on the wrong fringe order. The principle by which fringe order is determined can be explained by looking at a plot of intensity versus spacing for interference fringes generated for two or more colors. FIG. 10 illustrates such a plot for two colors. The intensity function 81 for $\lambda_1$ has a different period than that for $\lambda_2$ (82). By comparing the normalized measured intensity with the normalized theoretical intensity for both colors the spacing can be determined but there may be some uncertainly as to fringe order. For example, the normalized intensity difference between $\lambda_1$ $\lambda_2$ at points 84 and 85 is the same at different orders. This is solved by measuring the intensity continuously while the spacing between the transparent article and the reflective surface is changed (increased) which shows the slope of the respective functions beyond the initial point 84. This enables identification of the correct order.

To determine the correct fringe order, the entire calibration intensity trace is used as follows;

Several different first guesses are made for the spacing for the first point in the calibration trace. The criteria for selection of the first point initial guesses for spacing are that each spacing must have a low value of (e). Additionally, each guess must be at least 100 nm away from all the previously-selected initial guesses for spacing. Once several of the initial guesses are obtained, one of the guesses is correct, but the correct one must be determined.

In order to determine which first guess is correct, a cumulative mean square error for each initial guess is calculated. The cumulative error is calculated by assuming that the spacing does not change by more than 100 nm between each point. The following process is used to calculate the cumulative mean square error for each initial guess of spacing.

First, the cumulative error is set to the (e) which corresponds to the initial guess for the spacing at the first point in the calibration trace. Next, the spacing at the second point is calculated by searching through all spacing values within ±100 nm from the first point. The (e) determined for the second point is added to the cumulative error. The second step is repeated for all remaining points in the calibration trace with the condition that each point must not be more than 100 nm away from the previous point. Once the cumulative error is calculated for each initial guess for spacing of the first point in the calibration, the spacing with the lowest cumulative error is determined to be the spacing for the first point in the calibration.

Analysis of the data taken during calibration has yielded the maximum and minimum intensity for each fringe and the fringe order for the spacing measured during the calibration step.

Since operational parameters may change after the after the calibration but before the measurement, the fringe order may change, hence a "follow" trace is recorded while any operation parameters are changed. It is assumed that the first point in the follow trace is within 100 nm of the first point of the calibration trace.

The spacing for each point in the follow trace is calculated as follows:

Point-by-point, the mean square error is determined for spacings with values from −100 to +100 nm away from the previous point. Note that, since the first point in the follow trace does not have a previous point, the spacing is calculated from the first point in the calibration trace. The spacing with the lowest (e) is determined to be the spacing, and the process is repeated for all points in the trace. By limiting the calculation such that each successive point must be within 100 nm of the previous point, the calculation can never jump to an incorrect fringe order.

Once the spacing for the follow trace is calculated, it can be assumed that the spacing for the first point in the measurement trace is within 100 nm of the last point of the follow trace. Since the approximate spacing for the first point of the measurement trace is known, the spacing for the measurement trace is performed using the same procedure used to calculate the spacing for the follow trace.

It should be noted that the 100 nm difference limit is arbitrarily selected and that other values may be used as allowed by the wavelengths of light used for measurement, i.e., the limit should not exceed ¼ wavelength.

Figure 4A:
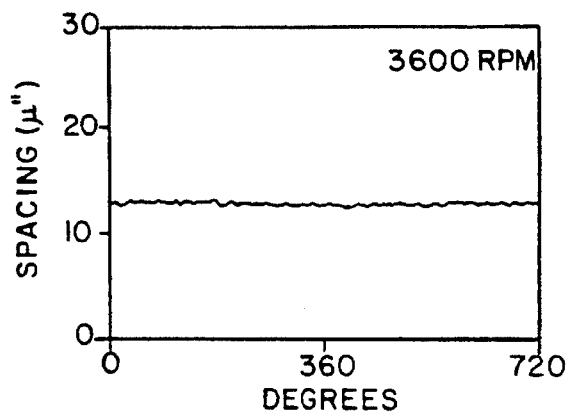
FIGS. 4a–4d are a series of plots of spacing versus angle of rotation.
Figure 4B:
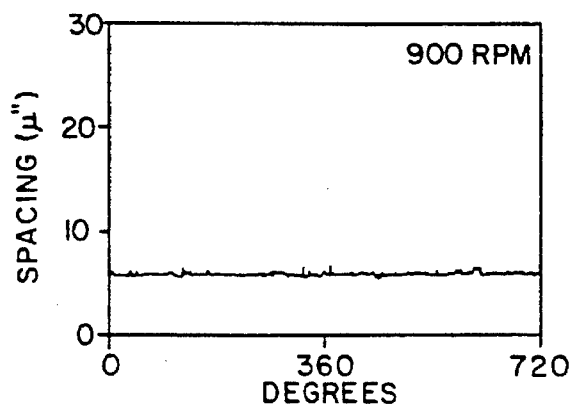
Figure 4C:
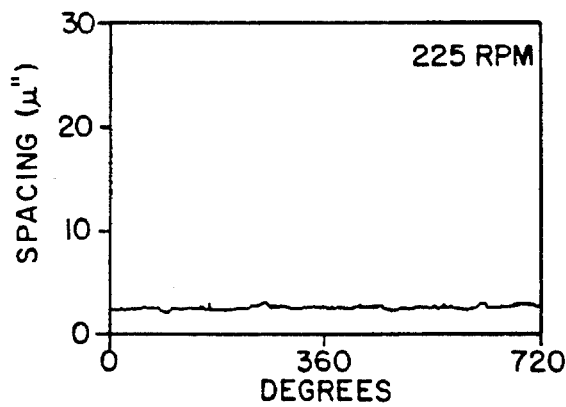
Figure 4D:
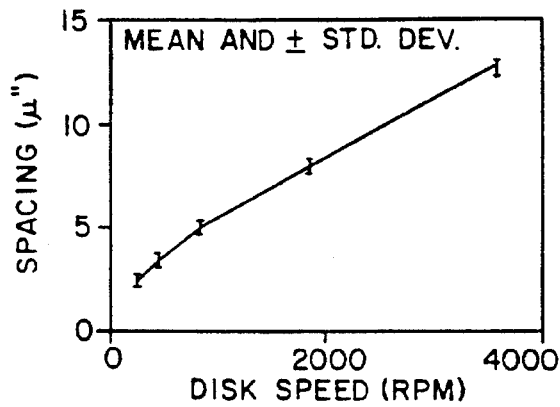

In the preferred embodiment, the flying height tester measures at least 256 points per revolution. A typical test involves storage of data of intensity versus angle for two revolutions. Thus, at least 512 points are taken for each data set. The processor converts intensity versus revolution data into spacing versus revolution and provides an output display in either the form of a video monitor or a printout. Since air bearing thickness is a function of disk speed, testing of the spacing between a given head and disk is preferably performed at a number of disk rotational speeds. FIG. 4 illustrates a series of plots of spacing versus angle for two revolutions. FIG. 4a, b and c show plots at 3,600 RPM, 900 RPM and 225 RPM, respectively. FIG. 4d is a plot of spacing versus disk speed illustrating the principle of increased spacing with increased rotational speed.

Figure 5:
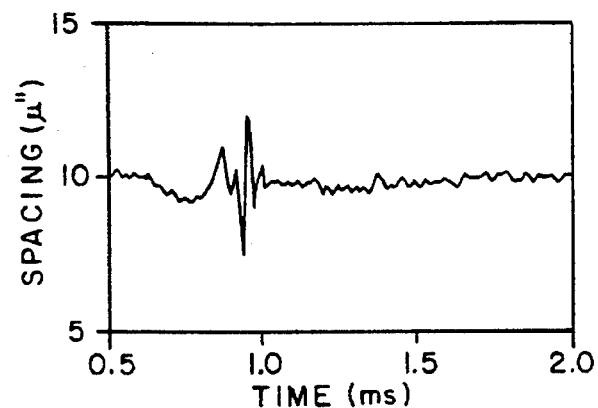
FIG. 5 is a plot of spacing versus time.

FIG. 5 is a plot of spacing versus time to show measurement by the system of dynamic variation of head/disk spacing after the head flies over a flaw in the disk.

Interferometric fringe intensity calibration is used to calibrate maximum and minimum intensity of light and dark interferometric fringes. The maximum and minimum fringe intensity is measured at one or more points on the interferometric image while altering interferometric path length by at least ¼ of the light being used to produce the interferometric image. By comparison of interferometric intensity to the maximum and minimum intensity, it is possible to obtain spatial measurement with a resolution of a small fraction of the wavelength of light used.

While a number of flying height testers use interference to measure the spacing between the head and media, the system of the present invention utilizes a unique calibration technique in which the head is unloaded in a controlled manner to increase the relative path lengths of the two light rays while monitoring and storing the intensity information in order to utilize interferometric fringe intensity for calibration of the measurement. Thus the need for expensive and difficult control of system components such as light sources, detector drift and disk quality is eliminated. The apparatus of the present invention provides high speed measurement of head/disk spacing simultaneously using multiple wavelengths of light, thus offering a more economical and faster measurement system and technique for dynamic measurement of flying height than systems that are currently available.

Figure 9:
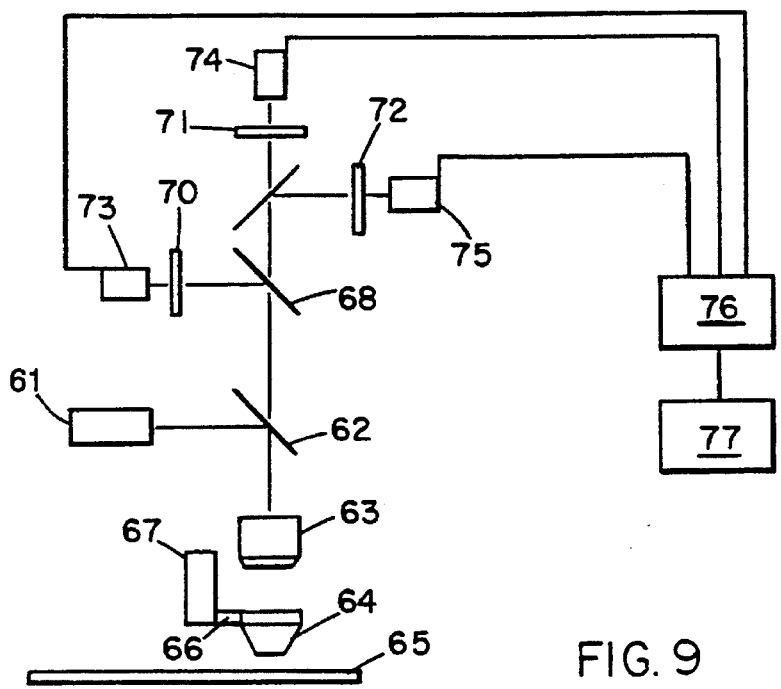
FIG. 9 is a diagrammatic view of an alternate embodiment in the form of an interferometric surface roughness/surface hardness measurement instrument.

Shown in FIG. 9 is another use of the intensity calibration method, here used for a micro-hardness tester/surface profiler. In FIG. 9, light from source 61 which could be a Mercury arc, a multiple laser, or other multi-wavelength source, goes through beamsplitter 62, then through microscope objective 63, being focused on the interface between transparent probe 64 and the surface to be analyzed 65. The probe is lowered onto the surface using computer-controlled actuator 67 which could use piezo-electric or other means of mechanically moving the probe 64 toward the surface 65. The contact load between the probe 64 and the surface 65 is detected by a load cell 66. Light reflected from the surface of the probe 64 which is closest to the sample surface and the surface itself 65 recombines, producing interference effects. Monochromatic images of the interference fringes are projected onto TV cameras 73, 74, and 75 after going through beamsplitters 62, 86 and 69, as well as narrow band interference filters 70, 71, and 72. Each TV camera then produces an analog video signal corresponding to the interferometric image for the narrow band of light associated with each interference filter. Note that filters 70, 71, and 72 each transmit a different color of light. The analog video signals are directed into the RGB color frame grabber 76 which is under control of the personal computer 77.

To make a surface roughness and hardness measurement, the computer controlled actuator 67 lowers the probe 64 onto the surface 65. During the time that the probe is coming into contact with the surface, the frame grabber 76 continuously acquires images of the three different interference images and the computer processes such images, storing the maximum and minimum intensity of each color at each pixel on each image. Before the probe 64 comes into contact with the surface 65, a minimum and maximum intensity of the fringes for each color will have been detected for each pixel of each image of the fringes. These maximum and minimum fringe intensity values are the normalization intensity values required to determine spacing between the probe 64 and the surface 65. The spacing between the probe 64 and surface 65 is calculated in a manner identical to that described for the Dynamic Flying Height Tester, except the spacing is calculated for a 2-dimensional area rather than a single spot, and the spacing is measured statically, not dynamically. Since the probe 64 shape is known beforehand, the surface profile of the surface 65 can be readily calculated from the spacing between the probe 64 and the surface 65. This surface profile indicates the roughness of the surface.

The surface hardness and other surface properties can be measured by pressing the probe 64 onto the surface 65. The force with which the probe is being pressed onto the surface is measured using load cell 66. The surface profile can continue to be measured interferometrically while it is being deformed by the probe. The measurement of surface deformation as a function of contact pressure will allow a measurement of surface hardness while causing a minimum amount of damage to the surface.

Both the Dynamic Flying Height Tester and the Interferometric Micro-hardness Tester illustrate ways that the Method to calibrate intensity for interferometric measurement of small spacing can be used. The feasibility of the measurement has been demonstrated by the measurements of flying height illustrated herein.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A method for simultaneously measuring roughness and hardness of a surface which comprises:

splitting light having a plurality of wavelengths $\lambda$ into a first portion and a second portion;

directing said first portion along a light path toward an interface between a transparent probe and said surface at a first location of said surface;

attaching a load cell to said probe;

reflecting said first portion from said interface;

combining the reflected said first portion and said second portion to generate fringe patterns;

storing maximum and minimum intensity of said fringe patterns for each wavelength $\lambda$;

calculating spacing using said maximum and minimum intensity;

moving said probe toward said surface while continuously generating said fringe patterns and storing their maximum and minimum intensity; and detecting a contact load between said probe and said surface while said probe deforms said surface.

2. An interferometric apparatus for simultaneously measuring roughness and hardness of a first surface comprising:

a light source for producing light having a first wavelength and a second wavelength;

a measuring probe positioned proximate to the first surface, said measuring probe having a surface adjacent the first surface, said measuring probe surface and the first surface defining a probe-to-surface spacing having a separation distance;

optics for directing said first and second wavelengths of light to said probe-to-surface spacing having said separation distance, such that light reflected from the first surface and said measuring probe surface produces a first wavelength interference signal and a second wavelength interference signal, said first and second wavelength interference signals having characteristics determined by said probe-to-surface spacing separation distance;

a detector for measuring the intensities of said first and second wavelength interference signals;

a calibration controller for changing said probe-to-surface spacing separation distance while acquiring first and second calibration fringe patterns corresponding to said first and second wavelengths;

a processor for analyzing said measured intensities of said first and second wavelength interference signals and deriving therefrom said probe-to-surface spacing separation distance; and a load cell attached to said measuring probe wherein said load cell detects a contact load between said measuring probe and the first surface when said measuring probe contacts and deforms the first surface.

3. An interferometric apparatus as defined in claim 2 wherein said processor further comprises:

a look-up-table which contains a first set of theoretical interference signal intensity data which corresponds to said first wavelength of light and a second set of theoretical interference signal intensity data which corresponds to said second wavelength of light; and a comparator for comparing said measured intensities with said look-up-table theoretical intensities to determine said spacing.

4. An interferometric apparatus as defined in claim 2 wherein said light source further comprises a mercury arc lamp.

5. An interferometric apparatus as defined in claim 2 wherein said light source further comprises a laser.

6. An interferometric apparatus as defined in claim 2 wherein said optics further comprises a microscope assembly.

7. An interferometric apparatus as defined in claim 2 wherein said detector further comprises one of either a photodetector or a photodetector array.

8. An interferometric apparatus as defined in claim 2 wherein said light source further comprises a first laser for producing said first wavelength of light and a second laser for producing said second wavelength of light.

9. A method for simultaneously measuring roughness and hardness of a surface comprising the steps of:

positioning a probe adjacent to a surface to be measured such that said probe and said surface define a separation distance between said probe and said surface;

measuring said separation distance between said probe and said surface interferometrically;

moving said probe toward said surface until said probe contacts and deforms said surface; and detecting a contact load between said probe and said surface while said probe deforms said surface.

* * * * *